(12) United States Patent
Yoshioka et al.

(10) Patent No.: US 6,708,543 B2
(45) Date of Patent: Mar. 23, 2004

(54) SHEET-METAL FORMED WITH SPACED PROJECTIONS AND MANUFACTURING METHOD OF THE SAME

(75) Inventors: Naoki Yoshioka, Okazaki (JP); Tsuyoshi Takahashi, Nishikamo-gun (JP); Yuichi Yagami, Toyota (JP)

(73) Assignee: Araco Kabushiki Kaisha, Toyoto (JP)

( * ) Notice: Subject to any disclaimer, the term of this patent is extended or adjusted under 35 U.S.C. 154(b) by 0 days.

(21) Appl. No.: 09/814,801

(22) Filed: Mar. 23, 2001

(65) Prior Publication Data

US 2001/0023603 A1 Sep. 27, 2001

(30) Foreign Application Priority Data

Mar. 23, 2000 (JP) .......................... 2000-082460

(51) Int. Cl.7 .......................... B21D 26/02; B21D 22/22
(52) U.S. Cl. .......................... 72/57; 29/421.1
(58) Field of Search .......................... 72/54, 56, 57, 72/59, 60; 29/421.1

(56) References Cited

U.S. PATENT DOCUMENTS

| | | | | |
|---|---|---|---|---|
| 3,463,035 A | * | 8/1969 | Bright | 72/60 |
| 3,646,653 A | * | 3/1972 | Richard | 72/54 |
| 3,768,142 A | * | 10/1973 | Raczek | 72/60 |
| 4,191,039 A | * | 3/1980 | Bradbury | 72/60 |
| 5,823,033 A | * | 10/1998 | Takayama et al. | 72/60 |
| 6,365,295 B1 | * | 4/2002 | Matsukawa et al. | 429/34 |
| 6,372,376 B1 | * | 4/2002 | Fronk et al. | 429/30 |
| 6,383,678 B1 | * | 5/2002 | Kaneko et al. | 427/115 |

FOREIGN PATENT DOCUMENTS

| | | |
|---|---|---|
| DE | 39 06 958 A1 | 9/1990 |
| DE | 197 17 953 A1 | 10/1998 |
| JP | 09076037 | 3/1997 |
| JP | 11167927 A | 6/1999 |

* cited by examiner

Primary Examiner—David B. Jones
(74) Attorney, Agent, or Firm—Oliff & Berridge, PLC (57) ABSTRACT

A sheet metal formed thereon with a number of spaced projections, wherein the projections are formed by the steps of positioning the sheet metal between a female die formed with a number of spaced recesses at one surface thereof and a male die formed with a concavity to be coupled with the female die and a number of spaced projections located at the bottom of the concavity to correspond with the recesses of the female die and pressing the sheet metal under existence of hydraulic fluid between the sheet metal and the concavity of the male die.

10 Claims, 8 Drawing Sheets

SHEET-METAL FORMED WITH SPACED PROJECTIONS AND MANUFACTURING METHOD OF THE SAME

BACKGROUND OF THE INVENTION

1. Field of the Invention

The present invention relates to a sheet metal formed thereon with a number of spaced projections (for example, suitable for use as a separator in fuel batteries) and a manufacturing method of the same.

2. Discussion of the Prior Art

There has been provided a sheet metal of less than 0.5 mm in thickness formed thereon with a number of spaced projections each of 2–3 mm in diameter and 0.4–0.6 mm in height and spaced in distance of 2–5 mm. In a manufacturing process of the sheet metal, as disclosed in Japanese Patent Laid-open Publication 11-167927, a sheet metal of stainless steel, aluminum Or copper is placed between upper and lower dies in the form of male and female dies and pressed by a half die cutting to form the spaced projections thereon. In the pressing process, a minimum space between the dies in a closed condition is set to become equal to the thickness of the sheet metal.

In the sheet metal pressed by the half die cutting, cracks will occur in the sheet metal and shear drops will occur at each shoulder or root of the projections. In addition, the sheet metal warps in its entirety due to the reaction after the pressing process. For this reason, it is very difficult to enhance the yield of the sheet metal in a reliable manner.

SUMMARY OF THE INVENTION

It is, therefore, a primary object of the present invention to provide a sheet metal formed thereon with a number of spaced projections and a manufacturing method of the same capable of forming the spaced projections without causing any crack and warp and any shear drops at each shoulder and root of the projections described above.

According to the present invention, the object is accomplished by providing a sheet metal formed thereon with a number of spaced projections, wherein the projections are formed by the steps of positioning the sheet metal between a female die formed with a number of spaced recesses at one surface thereof and a male die formed with a concavity to be slidably coupled with the female die and a number of spaced projections located at the bottom of the concavity to correspond with the recesses of the female die and pressing the sheet metal under existence of hydraulic fluid between the sheet metal and the concavity of the male die.

According to an aspect of the present invention there is provided a manufacturing method of a sheet metal formed thereon with a number of spaced projections in use of a hydraulic press machine having an upper die in the form of a female die formed with a number of spaced recesses at the bottom surface thereof and a lower die in the form of a male die formed with a concavity to be slidably coupled with the female die and a number of spaced projections located at the bottom of the concavity to correspond with the recesses of the female die, comprising the steps of positioning a sheet metal on an upper end surface of the lower die in such a manner as to prevent entry of the air into the concavity of the lower die in a condition where the concavity bas been filled with hydraulic fluid; moving down a blank holder placed at the outer circumference of the upper die to fixedly retain the sheet metal in position on the upper end surface of the lower die, moving down the upper die in a condition where hydraulic pressure between the concavity of the lower die and the sheet metal is maintained at a high pressure and inserting the upper die into the concavity of the lower die until it arrives at a position slightly higher than a lower dead point; and moving down the upper die in a condition where the hydraulic fluid is discharged from the concavity of the lower die and insert the upper die into the concavity of the lower die until it arrives near the lower dead point.

According to another aspect of the present invention, there is provided a manufacturing method of a sheet metal formed thereon with a number of spaced projections in use of a hydraulic press machine having an upper die in the form of a male die formed with a concavity and a number of spaced projections located at the bottom of the concavity and a lower die in the form of a female die formed at the upper surface thereof with a number of spaced recesses corresponding with the projections of the male die and placed to be slidably coupled within the concavity of the male die, comprising the steps of positioning a sheet metal on an upper end surface of the lower die; moving down a blank holder placed at the outer circumference of the upper die to fixedly retain the peripheral portion of the sheet metal in position on the upper end surface of the lower die; moving down the upper die and retaining it in engagement with the sheet metal; supplying hydraulic fluid into the concavity of the upper die in such a manner as to prevent entry of the air into the concavity of the upper die in a condition where the concavity has been filled with hydraulic fluid; raising the lower die in a condition where hydraulic pressure between the concavity of the upper die and the sheet metal is maintained at a high pressure and inserting the lower die into the concavity of the upper die until it arrives at a position slightly lower than an upper dead point; and raising the lower die in a condition where the hydraulic fluid is discharged from the concavity of the upper die and inserting the lower die into the concavity of the upper die until it arrives near the upper dead point.

BRIEF DESCRIPTION OF THE DRAWINGS

Other objects, advantages and features of the present invention will be more readily appreciated from the following detailed description of preferred embodiments thereof when taken together with the accompanying drawings, in which:

FIGS. 2 and 3(a), 3(b) to 5(a) and 5(b) illustrate a manufacturing process of the sheet metal in use of the hydraulic press machine shown in FIG. 1;

FIGS. 7 and 8(a), 8(b) to 10(a), 10(b) illustrate a manufacturing process of the sheet metal in use of the hydraulic press machine shown in FIG. 6.

DESCRIPTION OF TIM PREFERRED EMBODIMENTS

Figure 1:
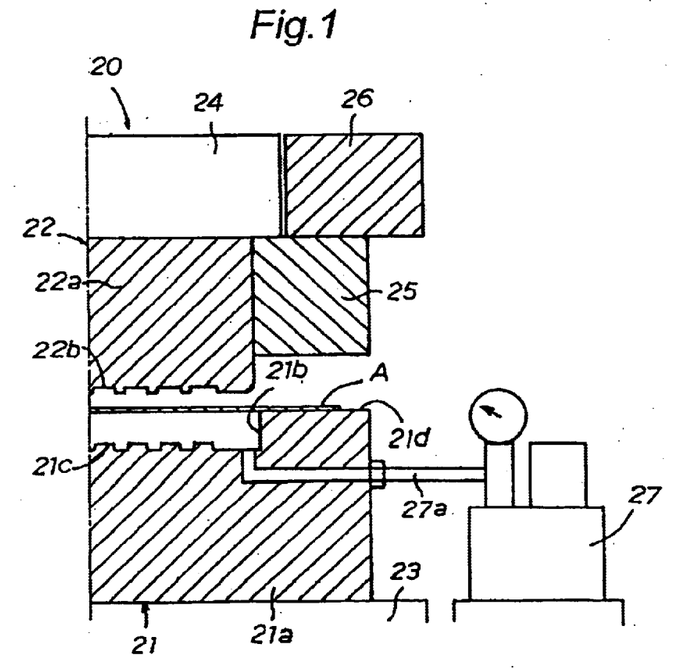
FIG. 1 is a vertical sectional view of a hydraulic press machine used for manufacturing a sheet metal formed thereon with a number of spaced projections in accordance with the present invention.
Figure 5:
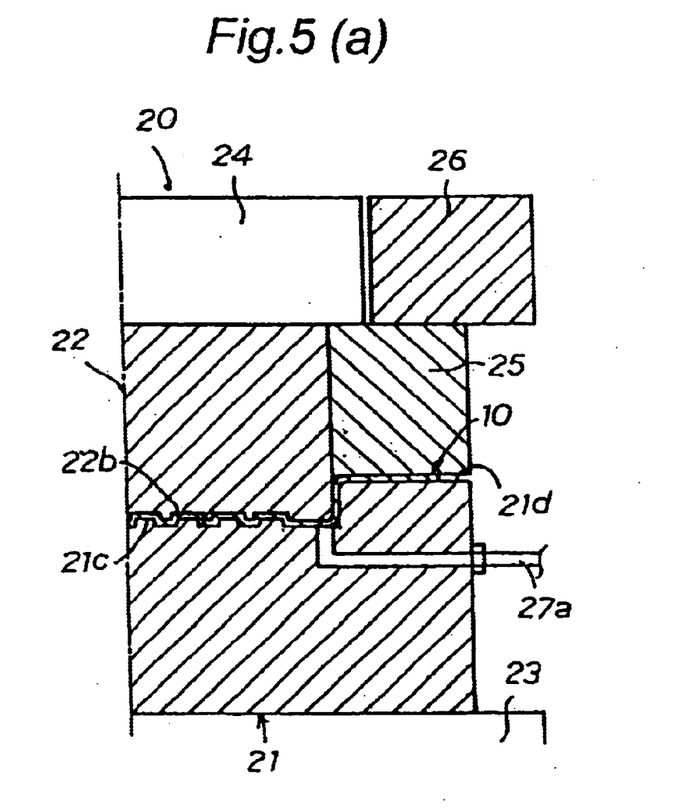

Illustrated in FIG. 1 of the drawings is a hydraulic press machine 20 used in a preferred embodiment of the present invention for manufacturing a sheet metal 10 shown in FIGS. 5(a) and 5(b). The sheet metal 10 is in the form of a sheet metal 11 of stainless steel (SUS 316L) of less than 0.5 mm in thickness, which is formed thereon with a number of spaced cylindrical projections 12 each of 2–3 mm in diameter and 0.4–0.6 mm in height and spaced in distance of 2–5 mm. The projections each are slightly tapered from their root to their head.

As shown in FIG. 1, the hydraulic press machine 20 includes a lower die 21 in the form of a male die mounted on a press head 23 and an upper die 22 in the form of a female die mounted to the bottom of an inner slider 24. The press machine 20 has a blank holder 25 placed at the outer circumference of upper die 22 and an outer slider 26 placed at the outer circumference of inner slider 24. The outer slider 26 is liftable and acts to lift the blank holder 25. Similarly, the inner slider 24 is liftable and acts to lift the upper die 22.

The body 21a of lower die 21 has a central portion formed with a concavity 21b the bottom of which is formed with a number of spaced projections 21c. A hydraulic power unit 27 is connected to the bottom of concavity 21b of lower die 21 by way of a fluid conduit 27a. The concavity 21b of lower die 21 is formed to correspond with the upper die 22, and the peripheral wall of lower die 21 is positioned to oppose at its upper end surface 21d to the blank holder 25 and to support a sheet metal A of stainless steel placed thereon. The body 22a of upper die 22 has a bottom portion formed with a number of spaced recesses 22b which correspond with the projections 21c formed on the bottom of concavity 21b of lower die 21. When the inner slider 24 is moved down, the upper die 22 is coupled within the concavity 21b of lower die 21.

In the following manufacturing process, a sheet metal of stainless steel (SUS316L) of 0.2 mm is used as the sheet metal A to manufacture a sheet metal formed thereon with a number of projections each of 2.3 mm in diameter and 0.5 mm in height and equally spaced in distance of 2.6 mm–3.0 mm. At a first step of this manufacturing process, the concavity of 21b of lower die 21 is supplied with hydraulic fluid from the hydraulic power unit 27 until the liquid surface of hydraulic fluid rises up to the upper end surface 21d of the peripheral wall of lower die 21. In such a condition, the stainless sheet metal A is placed on the upper end surface 21d of lower die 21 as shown in FIG. 1. In this instance, it is preferable that the stainless sheet metal A is coated with the hydraulic fluid at its bottom surface to prevent entry of the air into a space between the liquid surface of hydraulic fluid and the stainless sheet metal A and to eliminate the occurrence of air bubbles in the hydraulic fluid filled in the concavity 21b of lower die 21.

Figure 2:
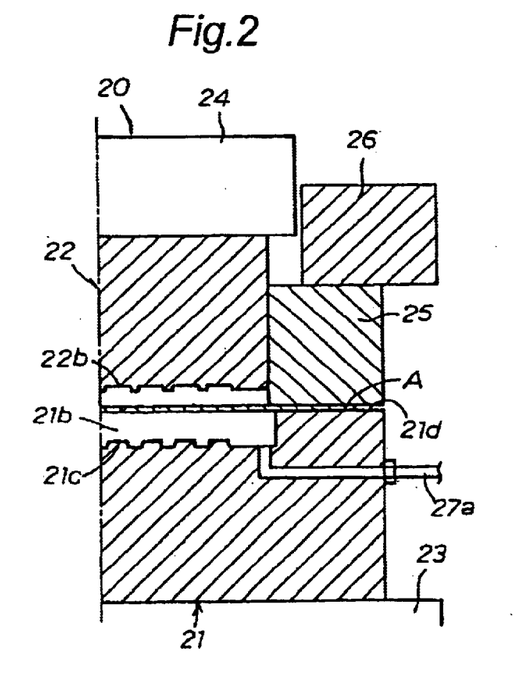
Figure 3:
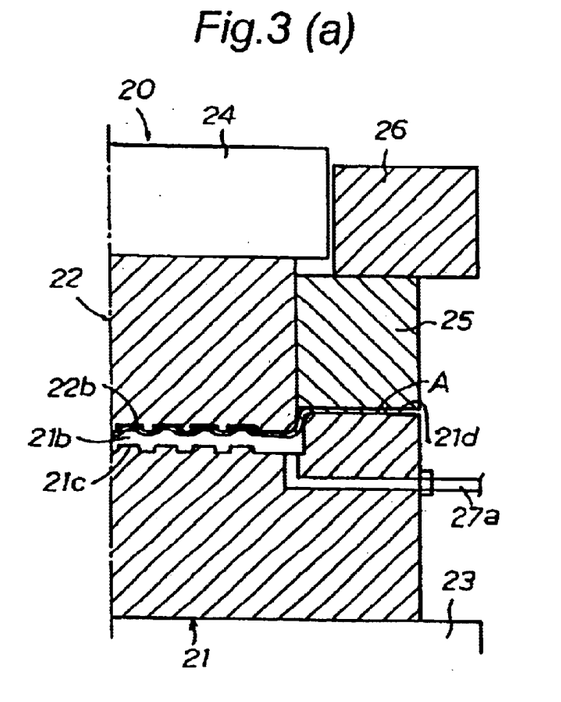

At a second step of the manufacturing process, the blank bolder 25 is moved down with the outer slider 26 as shown in FIG. 2 to fixedly retain the peripheral portion of the stainless sheet metal A in position on the upper end surface 21d of lower die 21. At this stage, the stainless sheet metal A is applied with hydraulic pressure of about 140 kgf/cm$^2$. At a third step of the manufacturing process, as shown in FIG. 3(a), the upper die 22 is moved down with the inner slider 24 in a condition where the hydraulic pressure between the concavity 21b of lower die 21 and the stainless sheet metal A is maintained at a high pressure. In this instance, as shown in FIG. 3(a), the upper die 22 is inserted into the concavity 21b of lower die 21 until it arrives at a position slightly higher than a lower dead point, and the hydraulic pressure in the concavity 21b of lower die 21 is maintained at about 2000 kgf/cm$^2$. In this embodiment, the lower dead point of upper die 22 is defined by a position where the space between the projections 21c of lower die 21 and the recesses 22b of upper die 22 becomes substantially equal to the thickness (0.2 mm) of stainless sheet metal A when the upper die 22 was completely moved down. It is, therefore, preferable that the space between the lower and upper dies 21 and 22 becomes about 1.2 mm when the upper die 22 was inserted into the concavity 21b of Lower die 21. Thus, as shown in FIG. 3(b), the stainless sheet metal A is formed with a number of spaced projections 12a.

Figure 4:
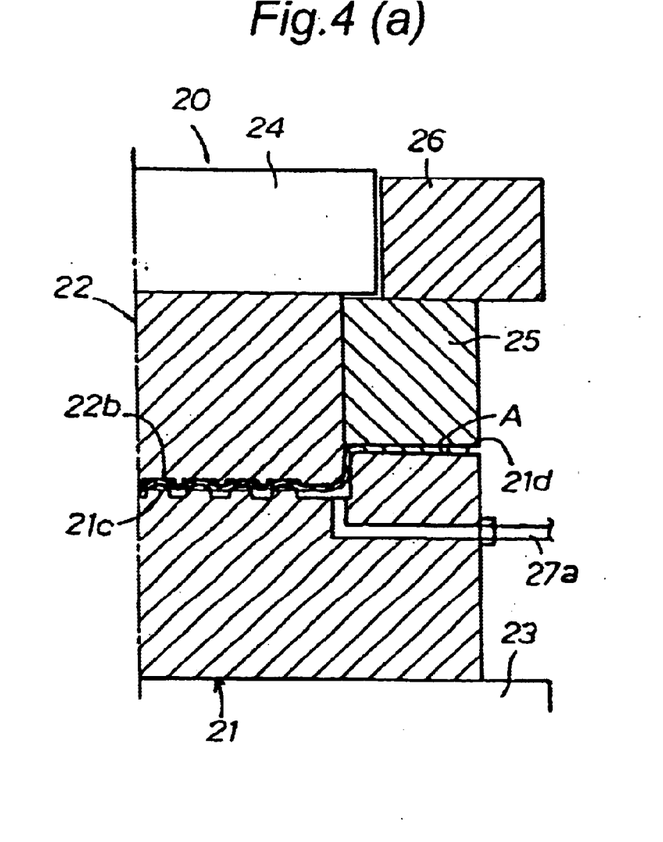

At a fourth step of the manufacturing process, the hydraulic power unit 27 is deactivated, and the fluid conduit 27a is connected to a fluid reservoir (not shown) to discharge the hydraulic fluid from the concavity 21b of lower die 21 Thereafter, the upper die 22 is further moved down wit the inner slider 24 to discharge the hydraulic fluid remained between the concavity 21b of lower die 21 and the stainless sheet metal A. In this instance, as shown in FIG. 4(a), the upper die 22 is inserted into the concavit 21b of lower die 22 until it arrives at near the lower dead point. It is preferable that the space between the lower and upper dies 21 and 22 becomes about 0.5 mm when the upper die 22 was inserted into the concavity 21b of lower die 21 as described above. At this stage, the stainless sheet metal A is pressed under existence of the hydraulic fluid between he projections 21c of lower die 21 and the recesses 22b of upper die 22 so that the projections 12a of stainless sheet metal A are reformed in the form of a number of spaced projections 12b as shown in FIG. 4(b). At a fifth step of the manufacturing process, the upper die 22 is moved down with the inner slider 24 in a condition where the hydraulic fluid was fully discharged from the concavity 21b of lower die 21. In this instance, as shown in FIG. 5(a), the upper die 22 is inserted into the concavity 21b of lower die 21 until it arrives at the lower dead point. At this final stage, the projections 12b of stainless sheet metal A are pressed again and deformed in the form of projections 12 as shown in FIG. 5(b). Thus, the sheet metal 10 formed with the spaced projections 12 is manufactured.

As in the manufacturing process, the stainless sheet metal is pressed under the existence of the hydraulic fluid between the lower and upper dies 21 and 22 and deformed under pressure in a condition where the hydraulic fluid is successively discharged at two steps. The stainless sheet metal A can be formed with the spaced projections 12 without causing any crack and warp and shear drop at each shoulder and root of the projections.

Figure 6:
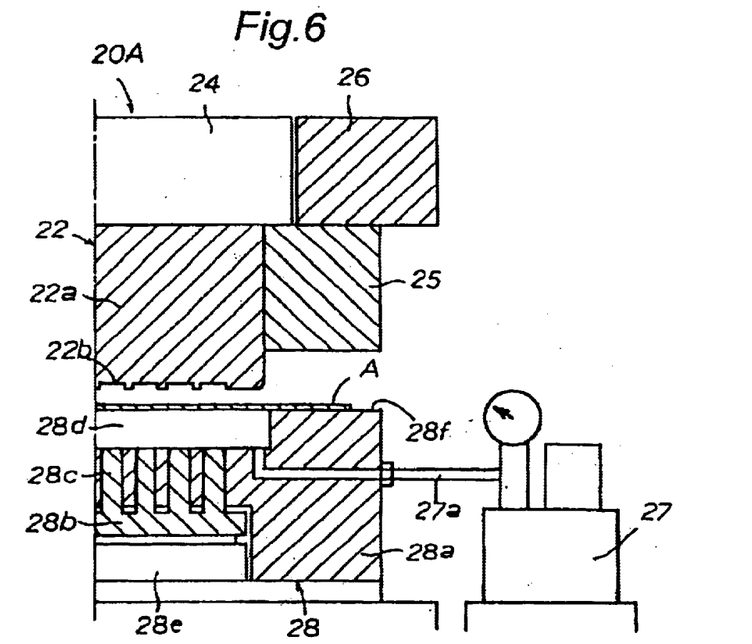
FIG. 6 is a vertical sectional view of a hydraulic press machine used for manufacturing the sheet metal in another embodiment of the present invention.
Figure 8:
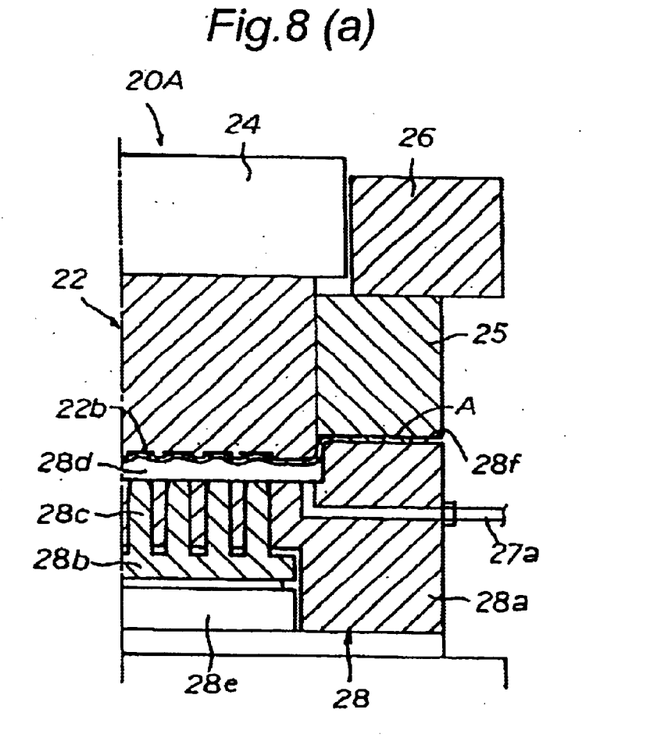
Figure 9:
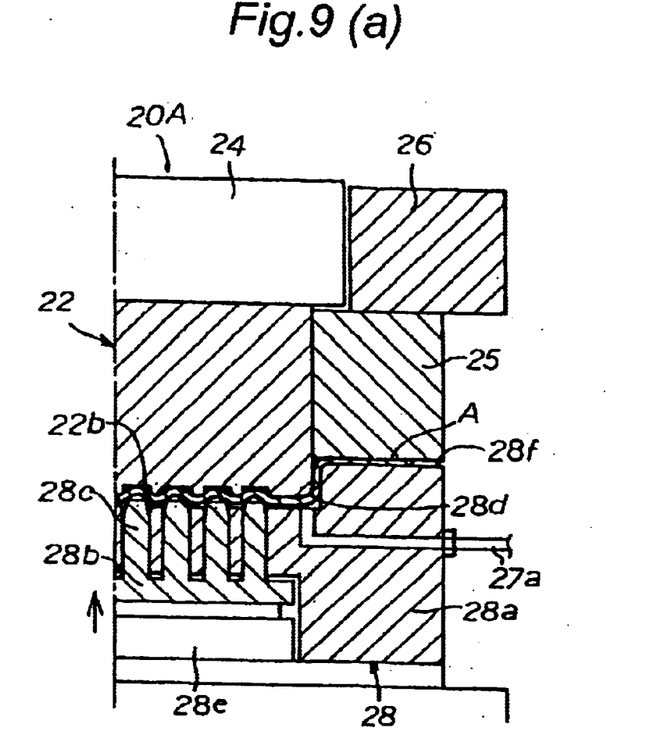

Illustrated in FIG. 6 is a hydraulic press machine 20A used in another embodiment of the present invention for manufacturing a separator in the form of a sheet metal adapted for use in fuel batteries. In the hydraulic press machine 20A, only a lower die 28 is replaced with the lower die 21 of the press machine 20 shown in FIG. 1. The lower die 28 of the press machine 20A is composed of a stationary lower die 28a and a movable die 28b. The movable die 28b is provided with a number of spaced columnar portions 28c which are slidably coupled with the corresponding through boles in the bottom portion of stationary die 28a in such a manner that each head of the columnar portions 28c is projected into the bottom of concavity 28d of stationary lower die 28a. The movable die 28b is arranged to be raised by operation of a hydraulic cylinder 28e. When the movable die 28b is raised toward the stationary lower die 28a, the heads of columnar portions 28c are projected in a predetermined height from the bottom of concavity 28d of stationary lower die 28a as shown in FIGS. 8(b) and 9(b) and positioned as in the projections 21c of lower die 21 in the press machine shown in FIG. 1. It this embodiment, the lower dead point of the upper die 22 is defined by a position where the space between the heads of columnar portions 28c projected from the bottom of concavity 28d and the recesses 22b of upper die 22 becomes substantially equal to the thickness (0.2 mm) of stainless sheet metal A when the upper die 22 was completely moved down. Other component parts and construction of the press machine 20A are substantially the same as those of the press machine 20 shown in FIG. 1. Thus, the same component parts and portions as those of the press machine 20 are designated by the same reference numerals as those in FIG. 1.

At a first step of a manufacturing process of the sheet metal in this embodiment the concavity 28d of lower die 28 is supplied with hydraulic fluid from the hydraulic power unit 27 until the liquid surface of hydraulic fluid rises up to the upper end surface of 28f of tie peripheral wall of stationary lower die 28a. In such a condition, the stainless sheet metal A is placed on the upper end surface of the peripheral wall of stationary lower die 28a as shown in FIG. 6. In his instance, it is preferable that the stainless sheet metal A is coated with the hydraulic fluid at its bottom surface to prevent entry of the air into a space between the liquid surface of hydraulic fluid and the bottom of stainless sheet metal A and to eliminate the occurrence of air bubbles in the hydraulic fluid filled in the concavity 28d of stationary lower die 28a.

Figure 7:
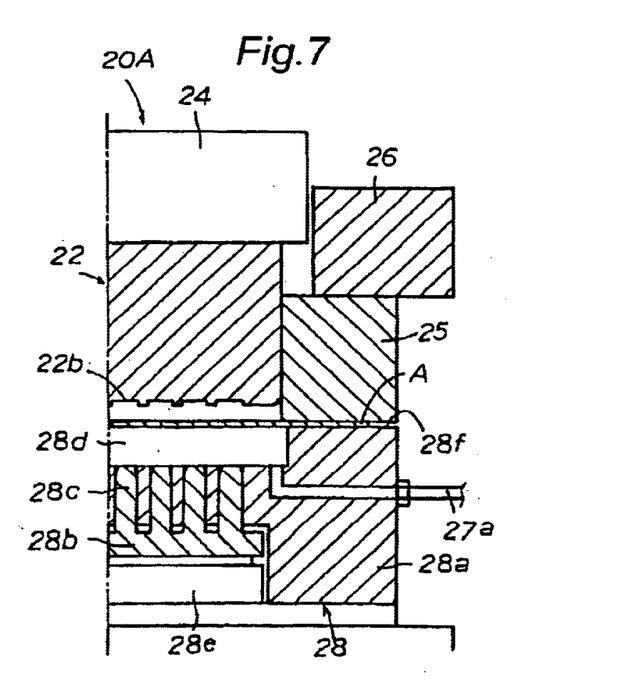

At a second step of the manufacturing process, the blank holder 25 is moved down with the outer slider 26 as shown in FIG. 7 to fixedly retain the peripheral portion of the stainless sheet metal A in position on the upper end surface 28f of stationary lower die 28a. At this stage, the stainless sheet metal A is applied with pressure of about 140 kfg/cm². At a third step of the manufacturing process, the upper die 22 is moved down with the inner slider 24 in a condition where the hydraulic pressure between the concavity 28d of stationary lower die 28 and the stainless sheet metal A is maintained at a high pressure. In this instance, as shown in FIG. 8(a), the upper die 22 is inserted into the concavity 28d of stationary lower die 28a until it arrives at a position sightly higher than the lower dead point, and the hydraulic pressure in the concavity 28d of stationary lower die 28a is maintained at about 2000 kgf/cm². At this stage, it is preferable that the space between the lower and upper dies 28 and 22 becomes 1.2 mm when the upper die 22 was inserted into the concavity 28d of stationary lower die 28a. Thus, as shown in FIG. 8(b), the stainless sheet metal A is formed with a number of spaced projections 12a.

At a fourth step of the manufacturing process, the hydraulic power unit 27 is deactivated, and the fluid conduit 27a is connected to a fluid reservoir (not shown) to discharge the hydraulic fluid from the concavity 21b of lower die 21. Thereafter, the movable die 28b is raised in a predetermined amount by operation of the hydraulic cylinder 28e in a condition where the hydraulic fluid remained between the concavity 28d of stationary lower die 28a and the stainless sheet metal A is discharged. In this instance, as shown in FIG. 9(a), the heads of columnar portions 28c of movable die 28b are projected from the bottom of concavity 28d of stationary lower die 28a, and the upper die 22 is inserted into the concavity 28d of stationary lower die 28a. It is preferable that the space between the lower and upper dies 28 and 22 becomes 0.5 mm when the upper die 22 was inserted in the concavity 28d of lower die 28 as described above. At this stage, the stainless sheet metal A is pressed under existence of the hydraulic fluid between the heads of columnar portions 28c of movable die 28b and the recesses 22b of upper die 22 so that the projections 12a of stainless sheet metal A are reformed in the form of a number of spaced projections 12b as shown in FIG. 9(b).

Figure 10:
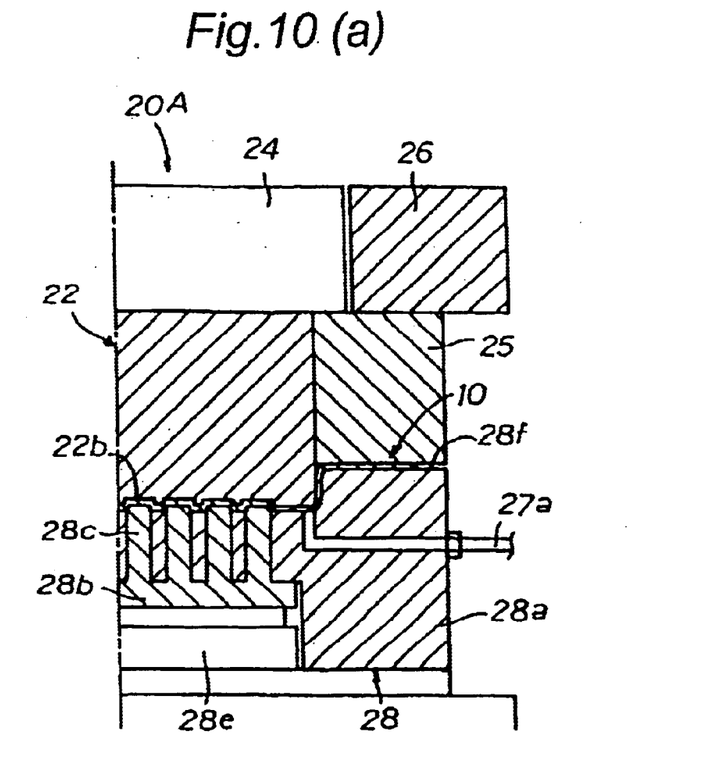

At a fifth step of the manufacturing process, the upper die 22 is moved down with the inner slider 24 in a condition where the hydraulic fluid was fully discharged from the concavity 28d of stationary lower die 28a. In this instance, as shown in FIG. 10(a), the upper die 22 is inserted into the concavity 28d of lower die 28a until it arrives at the lower dead point. At this final stage, the projections 12b of stainless sheet metal A are pressed again and deformed in the form of spaced projections 12 as shown in FIG. 10(b). Thus, the sheet metal formed with the spaced projections 12 is manufactured.

As in the manufacturing process, the stainless sheet metal is pressed under existence of the hydraulic fluid between the lower and upper dies 28 and 22 and deformed under pressure in a condition here the hydraulic fluid is successively discharged at two steps, the stainless sheet metal A can be formed with the spaced projections 12 without causing any crack and warp and any shear drops at each shoulder and root of the projections.

In a practical embodiment of the present invention, the lower die 21 or 28 in the hydraulic press machine 20 or 20A may be replaced with the upper die 22, while the upper die 22 may be replaced with the lower die 21 or 28. In such a case, the air is exhausted from a space between the sheet metal and the concavity of the upper die in a condition where the sheet metal has been fixedly retained by the upper and lower dies, and the hydraulic fluid is supplied into the space in such a manner as to prevent entry of the air into the concavity of the upper die in a condition where the concavity has been filled with the hydraulic fluid.

What is claimed is:

1. A method of manufacturing a sheet metal product formed thereon with a number of equally spaced projections by means of a hydraulic press machine composed of an upper die in the form of a female die having a bottom surface formed with a number of equally spaced recesses and a lower die in the form of a male die having a concavity formed to be coupled with the female die and a number of spaced projections located at a bottom of the concavity to correspond with the recesses of the female die, comprising the steps of:

supplying hydraulic fluid into the concavity of the lower die until the liquid surface of hydraulic fluid rises up to an upper end surface of a peripheral wall of the lower die;

positioning a sheet metal on the upper end surface of the peripheral wall of the lower die in such a manner as to prevent entry of air into a space between the liquid surface of the hydraulic fluid and a bottom of the sheet metal;

lowering a blank holder placed at an outer circumference of the upper die to fixedly retain the sheet metal in position on the upper end surface of the peripheral wall of the lower die;

lowering the upper die so that the upper die is inserted into the concavity of the lower die in a condition where the hydraulic fluid in the concavity of the lower die is maintained at a high pressure and that the sheet metal is formed with a number of equally spaced projections by engagement with the recesses of the upper die;

discharging the hydraulic fluid from the concavity of the lower die during downward movement of the upper die in such a manner that the projections of the sheet metal are pressed and reformed under existence of the hydraulic fluid between the projections of the lower die and the recesses of the upper die; and lowering the upper die to a lower dead point so that the projections of the sheet metal are further pressed in a condition where the hydraulic fluid has been fully discharged from the concavity of the lower die, wherein the lower dead point of the upper die is defined by a position where a space between the projections of the lower die and the recesses of the upper die becomes substantially equal to a thickness of the sheet metal.

2. The method according to claim 1, further comprising applying a first positive pressure to the hydraulic fluid prior to deformation of the sheet metal by the upper die, and maintaining the hydraulic fluid at a second positive pressure greater than the first positive pressure before the upper die reaches the lower dead point.

3. The method according to claim 2, wherein the first positive pressure is about 140 kgf/cm$^2$, and the second positive pressure is about 2,000 kgf/cm$^2$.

4. The manufacturing method according to claim 1, wherein the projections of the sheet metal are further pressed for a predetermined time at the step of lowering the upper die to the lower dead point.

5. The manufacturing claim 1, wherein a sheet metal of stainless steel is used as the sheet metal.

6. A method of manufacturing a separator adapted for use in a fuel battery in the form of a sheet metal formed thereon with a number of equally spaced projections by means of a hydraulic press machine composed of a upper die having a bottom surface formed with a number of equally spaced recesses and a lower die having a concavity formed to be coupled with the upper die and a number of equally spaced projections located at a bottom of the concavity to correspond with the recesses of the upper die, comprising the steps of:

supplying hydraulic fluid from a hydraulic power unit into the concavity of the lower die until the liquid surface of the hydraulic fluid rises up to an upper end surface of a peripheral wall of the lower die;

positioning a sheet metal on the upper end surface of the peripheral wall of the lower die in such a manner as to prevent entry of air into a space between the liquid surface of hydraulic fluid and the sheet metal;

lowering a blank holder placed at an outer circumference of the upper die to fixedly retain the sheet metal in position on the upper end surface of the peripheral wall of the lower die;

lowering the upper die so that the upper die is inserted into the concavity of the lower die in a condition where the hydraulic fluid in the concavity of the lower die is maintained in a high pressure and that the sheet metal is formed with a number of equally spaced projections by engagement with the recesses of the upper die;

discharging the hydraulic fluid from the concavity of the lower die during downward movement of the upper die in such a manner that the projections of the sheet metal are pressed and reformed under existence of the hydraulic fluid between the projections of the lower die and the recesses of the upper die; and lowering the upper die to a lower dead point so that the projections of the sheet metal are further pressed in a condition where the hydraulic fluid has been fully discharged from the concavity of the lower die;

wherein the lower dead point of the upper die is defined by a position where a space between the recesses of the upper die and the projections of the lower die becomes substantially equal to a thickness of the sheet metal.

7. The method according to claim 6, further comprising applying a first positive pressure to the hydraulic fluid prior to deformation of the sheet metal by the upper die, and maintaining the hydraulic fluid at a second positive pressure greater than the first positive pressure before the upper die reaches the lower dead point.

8. The method according to claim 7, wherein the first positive pressure is about 140 kgf/cm$^2$, and the second positive pressure is about 2,000 kgf/cm$^2$.

9. The manufacturing method according to claim 6, wherein the projections of the sheet metal are further pressed for a predetermined time at the step of lowering the upper die to the lower dead point.

10. The manufacturing method according to claim 6, wherein a sheet metal of stainless steel is used as the sheet metal.

* * * * *